Patented Apr. 9, 1935                                                1,997,105

UNITED STATES PATENT OFFICE 1,997,105

MOISTPROOF COMPOSITION

Ralph T. K. Cornwell, Fredericksburg, Va., assignor, by mesne assignments, to Sylvania Industrial Corporation, Fredericksburg, Va., a corporation of Virginia No Drawing. Application February 20, 1931,
Serial No. 517,298

4 Claims. (Cl. 134—79)

This invention relates to novel compositions of matter particularly adapted to be taken up in a solvent or solvents and used as a lacquer to form moist-proof, transparent, non-greasy and non-tacky coatings which will readily heat-seal, and has as a general object the preparation of such compositions of matter in a simple, efficient and economical manner.

A more specific object of the invention is to provide a composition of matter composed of nitrocellulose, a small amount of wax and a relatively large proportion of a plasticizer which may be taken up in a solvent and used for coating transparent films of regenerated cellulose, cellulose acetate, gelatin and the like to produce a moist-proof wrapping material which has high transparency and will not blush, scale or smudge when used or handled.

Other objects of the invention will in part be obvious and will in part appear hereinafter.

The invention accordingly comprises novel products possessing the characteristics, properties and the relation of constituents and a process of manufacturing or formulating such products, all as exemplified in the following detailed disclosure and the scope of the application of which will be indicated in the claims.

In the Charch and Prindle United States Patent No. 1,737,187, there is disclosed a moist-proof coating composition comprising from 30 to 70 parts nitrocellulose, 30 to 60 parts of gum, 2 to 6 parts wax, and 5 to 30 parts of plasticizer, and the disadvantages of varying from these ingredients and proportions is pointed out at length. Such a composition, when applied as a coating on both sides of a sheet of regenerated cellulose one-thousandth of an inch thick to give a total thickness of coating of about two ten-thousandths of an inch, will give a product having a moist-proofness of about 80 times that of the uncoated sheet of regenerated cellulose when tested comparatively at 40° C.

I have found, however, that a composition giving the same order of moist-proofness and having other and superior qualities in addition can be obtained by eliminating entirely the gum compound and by using wax in amounts of less than 2%, and that the resultant film will be transparent and non-tacky, and will have a smoother and less greasy touch and a lesser tendency to blush or smudge when handled or rubbed than that produced in accordance with the preferred examples of the said patent.

Another, and possibly the most important improved property afforded by my novel composition is its remarkable ease of autogenous heat sealing at practical temperatures, (but slightly above 100° C.) which while effecting a much better seal, will not adversely affect the underlying wrapped article, as is frequently the case when heat sealing with the product prepared in accordance with the Charch and Prindle patent aforesaid. More particularly, to get any heat seal at all with the product of the Charch and Prindle patent, an excessive heat of from 175° to 200° C. or above must be applied, which in itself is often detrimental to the wrapped goods, especially if such heat contact is of the prolonged nature necessary to effect a reasonable sealing with that product. Further, with the composition of this invention, no objectionable odors arise from heat-sealing the composition as is the case with such heretofore known compositions containing a gum.

Specifically I have found that excellent moistproof compositions can be prepared by using the following materials in the following proportions:

Nitrocellulose  50% to 75%   (preferably 58% to 68%)
Wax              1   to 1.75
Plasticizer     25   to 50   (preferably 30% to 35%)

As more specific examples of mixtures of ingredients which I may use to form my novel coating composition, I give the following examples, but it is to be understood that I am not limited to the specific details thereof, all parts being by weight.

|  | I | II | III | IV | V |
|---|---|---|---|---|---|
| Nitrocellulose, 30 sec | 63.5 | | | | |
| Nitrocellulose, ½ sec | | 63.3 | 63.3 | 63.3 | 63.5 |
| Ozokerite | 0.5 | 0.6 | 0.6 | 0.6 | 0.5 |
| Paraffin | 0.5 | 0.6 | 0.6 | 0.6 | 0.5 |
| Spermaceti | 0.5 | 0.5 | 0.5 | 0.5 | 0.5 |
| Butyl o-benzoylbenzoate | 35.0 | 35.0 | | | |
| Di-butyl phthalate | | | 35.0 | | |
| Di-ethyl phthalate | | | | 35.0 | |
| Tri-cresyl phosphate | | | | | 35.0 |

With any of the formulæ given in the above examples, a suitable lacquer for forming coatings on transparent films may be prepared, for example, by dissolving 100 parts of the total ingredients in about 400 to 1000 parts of solvent or solvent mixture, whereupon the lacquer can be applied to the transparent film in any suitable manner and the solvents evaporated to give a desired thickness of coating.

I have found that if a film or sheet of regenerated cellulose, having a thickness of about one-thousandth of an inch, is coated, preferably on each side, with one of the above compositions to a thickness totalling about two-ten thousandths of an inch, the moist-proofness of the resulting wrapping material compared to unity for a sheet of uncoated regenerated cellulose one thousandth of an inch thick is:

83 for Example I
        77 for Example II
        57 for Example III
        56 for Example IV
        83 for Example V It will thus be seen that by means of the present invention there has been provided a coating composition which is of novel composition and which has improved and technically important properties, and since certain changes may be made in the above product and different embodiments of the invention could be made without departing from the scope thereof, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Particularly it is to be understood that in said claims, ingredients or compounds recited in the singular are intended to include compatible mixtures of such ingredients wherever the sense permits, and that the terms "coating" and "coated" are used herein in a broad sense.

Having described my invention, what I claim as new and desire to secure by Letters Patent is:

1. A moist-proof, transparent, non-greasy and non-tacky composition consisting of nitrocellulose, a plasticizer and a wax, the nitrocellulose being present in an amount from about 50% to 75%, the plasticizer being present in an amount of from about 25% to 50% and the wax being present in an amount of from about 1% to 1.75% by weight, said composition being heat-sealable at a temperature but slightly above 100° C.

2. A moist-proof, transparent, non-greasy and non-tacky composition consisting of nitrocellulose, a plasticizer and a wax, the nitrocellulose being present in an amount of from about 58% to 68%, the plasticizer being present in an amount of from about 30% to 35% and the wax being present in an amount of from about 1% to 1.75% by weight, said composition being heat-sealable at a temperature but slightly above 100° C.

3. A moist-proof, transparent, non-greasy and non-tacky composition consisting of a mixture of nitrocellulose, a plasticizer and a wax, the nitrocellulose being present in an amount of from about 58% to 68%, the plasticizer being present in an amount of from about 30% to 35% and the wax being present in an amount of about 1.5% by weight, the wax consisting of substantially equal parts of ozokerite, paraffin and spermaceti, said composition being heat-sealable at a temperature but slightly above 100° C.

4. A moist-proof, transparent, non-greasy and non-tacky composition consisting of a mixture of nitrocellulose, a plasticizer and a wax, the nitrocellulose being present in an amount of about 63%, the plasticizer being present in an amount of about 35% and the wax being present in an amount of 1.5% by weight, the wax consisting of substantially equal parts of ozokerite, paraffin and spermaceti, said composition being heat-sealable at a temperature but slightly above 100° C.

RALPH T. K. CORNWELL.